Jan. 12, 1960  J. B. HENWOOD ET AL  2,920,691
BURNER
Filed Oct. 25, 1956

FIG.

INVENTORS.
JAMES B. HENWOOD
SUMNER C. WOOD
BY
ATTORNEY.

United States Patent Office 2,920,691
Patented Jan. 12, 1960

2,920,691
BURNER

James B. Henwood, Bala-Cynwyd, Pa., and Sumner C. Wood, Grenloch, N.J., assignors to Selas Corporation of America, a corporation of Pennsylvania Application October 25, 1956, Serial No. 618,237

1 Claim. (Cl. 158—116)

The present invention relates to the combustion of fuel, and more particularly to a novel apparatus for buring relatively large quantities of fuel in a small space.

An object of the invention is to provide apparatus in which combustion can take place, and which can be used to perform useful work. Another object of the invention is to provide a burner in which air and gas are intimately mixed so that they will burn rapidly.

A more general object of the invention is to provide a burner of relatively small size that can be used to burn relatively large quantities of fuel with high efficiency.

In carrying out the present invention a stoichiometric mixture of fuel and air is supplied under pressure to a burner. This burner is provided with a combustion chamber into which the mixture is introduced in a multiplicity of small jets that are directed toward a point. Combustion takes place within the chamber rapidly on a molecular scale. The hot products of combustion are discharged from the chamber to perform useful work.

The various features of novelty which characterize our invention are pointed out with particularity in the claim annexed to and forming a part of this specification. For a better understanding of the invention, however, its advantages and specific objects attained with its use, reference should be had to the accompanying drawings and descriptive matter in which we have illustrated and described a preferred embodiment of the invention.

In the drawings:

Fig. 1 is a front view of the burner,

Figure 2:
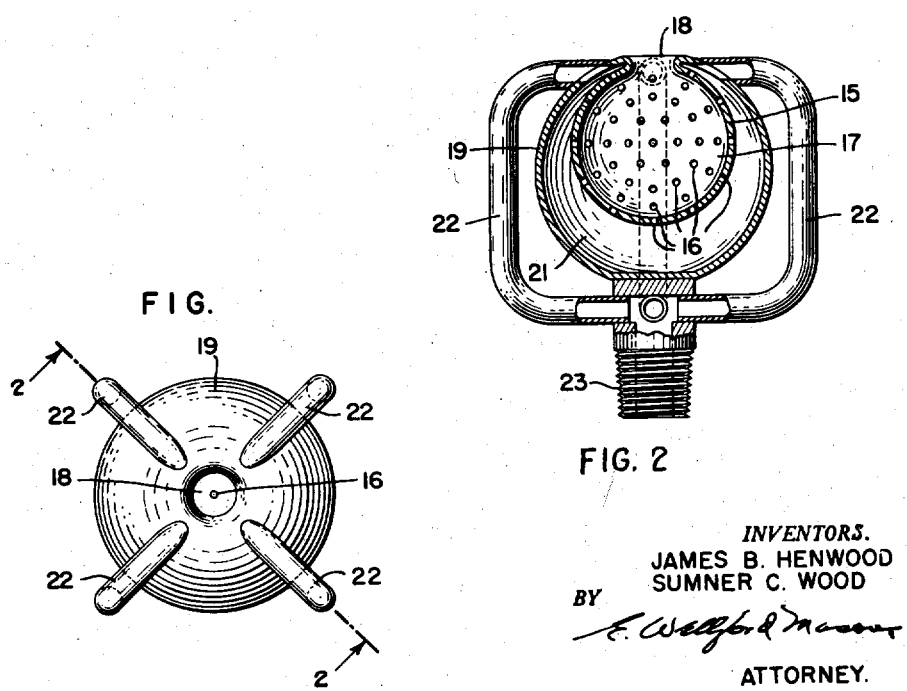
Fig. 2 is a section taken on line 2—2 of Fig. 1.

Referring to Figures 1 and 2 there is shown a spherical shell 15, made of sheet metal, that is provided with a multiplicity of small, radially directed orifices 16 leading to the center thereof which is the combustion chamber 17. This chamber is provided with a discharge orifice 18 that may be round, as shown, or a slot. A casing in the form of a larger sphere 19, also of sheet metal, surrounds sphere 16 to form between the two a manifold and distributing space 21. The spheres 15 and 19 are joined together eccentrically around the edge of orifice 18 so that the inner sphere is supported solely by and in spaced relation to the outer.

Fuel is supplied to the space 21 through a plurality of supply tubes 22 that are attached at one end to sphere 19 adjacent to the discharge orifice. The other ends of the supply tubes are mounted upon a fixture 23 that is adapted to be threaded to a supply pipe. As shown, fixture 23 is hollow, and is provided with passages that communicate with the interior of the supply tubes. It will be seen that sphere 19 is supported by supply tubes 22 and fixture 23. As shown herein, there are four of the tubes, although a greater or lesser number could be used.

In the operation of the burner, a combustible mixture of gas and air under suitable pressure is supplied to fixture 23. The mixture flows through tubes 22 into manifold space 21, from which it is discharged into combustion chamber 17 through the multiplicity or orifices 16. As the jets of mixture are discharged into chamber 17 they converge substantially toward a point in the center of the spherical space where they are turbulently mixed, ignited and burn at high velocity. Combustion is completed within the chamber and hot products of combustion are discharged through outlet 18. These products are at a temperature substantially equal to the temperature of combustion and are traveling at an extremely high velocity.

The introduction of the fuel into the manifold space adjacent to the discharge orifice produces the greatest cooling effect of the gases at the hottest portion of the burner. The cooling effect of the mixture flowing through orifices 16 is sufficient to maintain the temperature of sphere 15 below a red heat, even though a temperature of combustion is being maintained in the center thereof.

The following is given as an example of a burner of the type just described. The spherical combustion chamber is made of stainless steel 1½" diameter having a volume of 1.55 cu. in. The sphere is drilled to provide 96 radial holes 0.035" diameter on ¼" centers, with a discharge opening ⅜" diameter. The outer casing is 2" diameter and made of brass. The burner was operated satisfactorily with a gas-air mixture of from 8,000 B.t.u. per hour at an inlet pressure a little over 4.75" water to a mixture of 177,000 B.t.u. per hour at an inlet pressure of 27 pounds per square inch. It is noted that the temperature of the outer casing varied from about 600° F. adjacent to the outlet to about 200° F. at a point opposite the outlet. It is apparent from observation that essentially all combustion occurs within the combustion chamber with the products of combustion issuing therefrom at substantially the temperature of the flame and it is estimated that the velocity of the exhausting gases is 2800 feet per second.

In manufacturing the burners disclosed, the combustion chamber is preferably made from sheet metal such as stainless steel which will not be affected by temperatures encountered along its surface. The exterior shell may be made of stainless steel or brass. In each case the various parts are formed and assembled by brazing. The various orifices or passages through which the fuel mixture passes are preferably drilled in the combustion chamber wall on centers that may be spaced from ⅛ to ¾ inch, and they have a small diameter close to 0.035", mentioned above.

A premixed stoichiometric mixture of fuel gas and air will be supplied under pressure to the burner in a multiplicity of symmetrically directed jets. The additional turbulent mixing of the fuel and air that takes place in the combustion chamber when the various jets meet is practically on a molecular scale. Burning takes place in an atmosphere of fuel, air, flame gases and hot products of combustion and is almost instantaneous. Thus extremely large quantities of fuel can be burned in a relatively small space. The products of combustion are discharged at substantially flame temperature and at high velocity. These gases can be used for useful heating or chemical purposes.

It will be seen that the burner has no refractory or other heat absorbing material. Therefore it will both heat up and cool down quickly. In addition the cooling effect of the mixture flowing into the burner keeps the metal of which it is formed below the danger point. The heat absorbed by the mixture increases the temperature of the flame.

While in accordance with the provisions of the statutes, we have illustrated and described the best form of embodiment of our invention now known to us, it will be apparent to those skilled in the art that changes may be made in the form of the apparatus disclosed without departing from the spirit and scope of the invention as set forth in the appended claim, and that in some cases certain features of our invention may be used to advantage without a corresponding use of other features.

What is claimed is:

In a burner, the combination of a first hollow sphere, a second, and larger, hollow sphere surrounding the first, each of said spheres being provided with a single opening, means to fasten said spheres together around the edges of openings therein whereby the first sphere is carried by the second sphere eccentrically therein, said first sphere being provided over substantially its entire surface with a multiplicity of gas passages therein extending radially thereof, means to supply a combustile mixture to the interior of said second sphere to pass through said passages into the interior of said first sphere, to be burned therein, said means to pass the mixture into said second sphere including a plurality of tubes, means to connect one end of each tube with the interior of said second sphere adjacent to and spaced around the opening therein, a fixture to which the fuel mixture is supplied, and means to fasten the other ends of said tubes to said fixture at a point substantially diametrically opposed to said opening.

References Cited in the file of this patent

UNITED STATES PATENTS

| | | |
|---|---|---|
| 98,767 | Haskins | July 11, 1870 |
| 758,859 | Schwartz | May 3, 1904 |
| 1,246,523 | Backstrom | Nov. 13, 1917 |
| 1,531,532 | Wayles | Mar. 31, 1925 |
| 1,622,820 | Bastian | Mar. 29, 1927 |
| 1,745,920 | Erne | Feb. 4, 1930 |
| 1,794,869 | Schifferle | Mar. 3, 1931 |
| 1,800,617 | Forster | Apr. 14, 1931 |
| 1,879,886 | Schifferle | Sept. 27, 1932 |
| 2,113,426 | Engels | Apr. 5, 1938 |
| 2,544,419 | Goddard | Mar. 6, 1951 |

FOREIGN PATENTS

| | | |
|---|---|---|
| 775,075 | France | Oct. 1, 1934 |
| 445,463 | Germany | June 10, 1927 |